Dec. 3, 1968     O. J. B. CARON     3,414,722

AUTOMOBILE HEADLIGHT SYSTEM

Filed July 1, 1966

INVENTOR.
OSWALD J. B. CARON

United States Patent Office 3,414,722
Patented Dec. 3, 1968

3,414,722
AUTOMOBILE HEADLIGHT SYSTEM
Oswald J. B. Caron, 2–E Dunstable Road,
Nashua, N.H. 03060
Filed July 1, 1966, Ser. No. 562,285
5 Claims. (Cl. 240—7.1)

My invention is directed toward headlight systems for use in automobiles.

It is an object of my invention to provide a new and improved automobile headlight system utilizing sealed beam headlights having a surrounding annular dome which is translucent and can be electrically illuminated to reduce glare and provide better night vision for the driver of an automobile using such headlights.

Another object is to provide new and improved automobile headlights having individual domes as indicated above which can be easily installed on and removed from conventional sealed beam headlights.

Still another object is to provide new and improved automobile headlights of the character indicated which can be manufactured easily and inexpensively.

Figure 1:
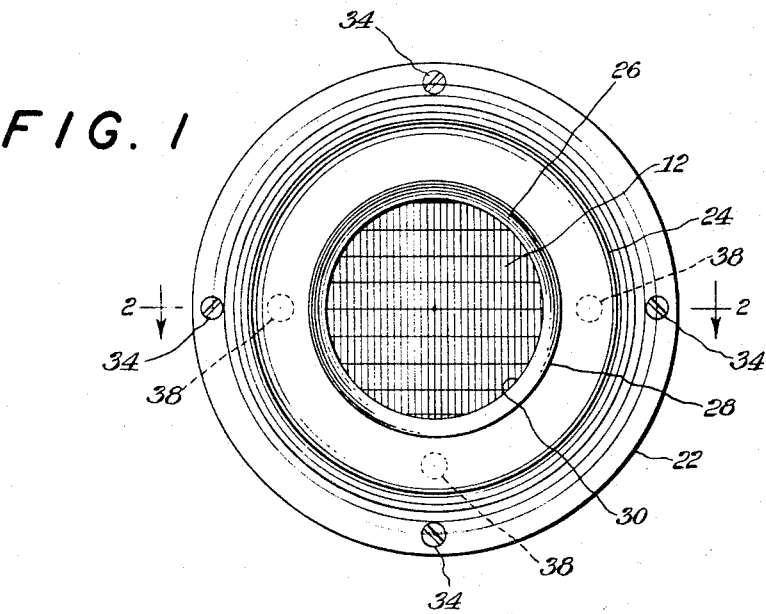
Figure 2:
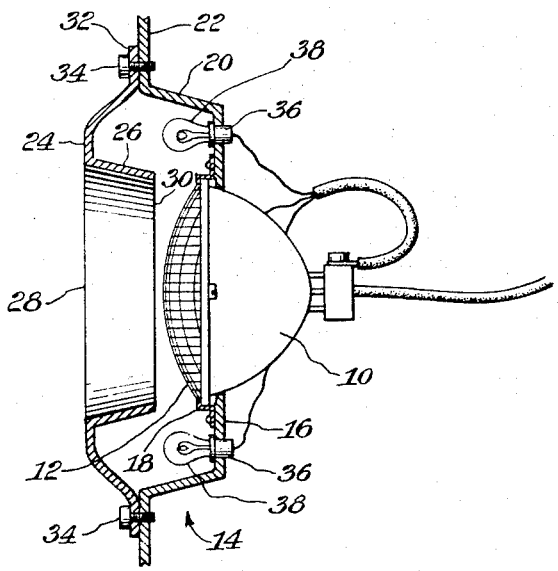

All of the foregoing and still further objects and advantages of my invention will now be explained with reference both to this specification and to the accompanying drawings wherein:

FIG. 1 is a front view of one automobile headlight having an individual dome in accordance with my invention; and FIG. 2 is a view through 2—2 of FIG. 1.

Referring now to FIGS. 1 and 2, there is shown a conventional sealed beam headlight 10 having a front curved transparent lens 12 having a circular perimeter of given diameter. An annular metal flange 14 has a first vertical annular lip 16 disposed around the periphery of the lens and secured thereto by peripheral clamp 18. An outward flaring conical element 20 integral with lip 16 is also integral with a second vertical annular lip 22 spaced away from the lens and centered on the first lip, the second lip having a substantially larger diameter than the first lip.

A hollow translucent annular dome 24, preferably colored red, has a center opening centered on the lens and having a larger diameter than that defining the circular periphery thereof. This center opening defines the larger circular opening 28 of a hollow truncated cone 26 having its horizontal axis aligned with the center of said lens and tapering inward to a smaller circular opening 30 of essentially the same diameter as said periphery and spaced apart therefrom. Dome 24 has a vertical outer annular lip 32 overlying lip 22 and secured thereto in water tight relationship by bolts 34.

Lip 22 carries three spaced apart automobile lamp sockets 36, two of these sockets being oppositely disposed and lying along a horizontal line, the third socket being equidistantly disposed from the other two sockets and positoned below the horizontal line. A lamp 38 having a horizontal axis is mounted in each socket and is disposed intermediate the lip 16 and the dome 24. These lamps are wired in parallel and can be turned on and off independently of the light 10.

If desired, a fourth lamp socket can be secured to said lip 22 equidistantly disposed between the two sockets lying on a horizontal line and positioned thereabove. A fourth lamp can be mounted in this socket and connected to a flasher circuit to flash on and off when the other three lamps are turned on and off.

In use, two such automobile headlights with domes can be installed in the front of an automobile. When the automobile is driven in the dark, cone 26 focuses and directs the sealed beam lights in proper manner, but the dome, particularly when the three lamps 38 are turned on, deflects the glare from the sealed beam lights and gives the driver a second chance to avoid collisions, particularly head on collisions. When the sealed beam lights are off the lamps 38 can illuminate the dome in such manner as to provide excellent illumination in fog, smoke and the like.

While I have described my invention with particular reference to the drawings, my protection is to be limited only by the terms of the claims which follow.

Having thus described my invention, I claim as new and desire to secure by Letters Patent:

1. An automobile head light system comprising a sealed beam head light having a front lens having a circular periphery, an annular lip surrounding said lens, a hollow annular translucent dome having a center opening centered on said lens and having a larger diameter than said lens, and a hollow truncated cone open at both ends, the larger end connected to the center opening of said dome and having essentially the same diameter as said opening, the axis of said cone being aligned with the centers of said lens and said opening, the smaller end having a diameter essentially the same as that of said lens and spaced apart therefrom and means securing said dome to said lip.

2. A system as set fourth in claim 1 further including at least one lamp interposed between said dome and said lip and extending perpendicularly to said lip.

3. A system as set forth in claim 2 having three spaced apart lamps.

4. A system as set forth in claim 3 wherein two of said lamps are spaced opposite each other on said lip and are located on a horizontal line.

5. A system as set forth in claim 4 wherein said third lamp is secured to said lip in a position equidistant from the other two lamps and below said line.

References Cited

UNITED STATES PATENTS

| | | | |
|---|---|---|---|
| 2,668,902 | 2/1954 | Fisher | 240—7.1 |
| 2,764,673 | 9/1956 | McClintock | 240—7.1 |
| 3,032,645 | 5/1962 | Wilfert | 240—8.1 |

NORTON ANSHER, *Primary Examiner.*

RICHARD L. MOSES, *Assistant Examiner.*